United States Patent [19]

Bahn

[11] Patent Number: 5,168,190
[45] Date of Patent: Dec. 1, 1992

[54] RELUCTANCE-TYPE MOTOR
[75] Inventor: Itsuki Bahn, Nerima, Japan
[73] Assignee: Kabushikigaisha Sekogiken, Tokyo, Japan
[21] Appl. No.: 684,929
[22] PCT Filed: Aug. 28, 1990
[86] PCT No.: PCT/JP90/01090
  § 371 Date: Apr. 25, 1991
  § 102(e) Date: Apr. 25, 1991
[87] PCT Pub. No.: WO91/03858
  PCT Pub. Date: Mar. 21, 1991

[30] Foreign Application Priority Data

Aug. 28, 1989 [JP] Japan .................. 1-218674
Aug. 28, 1989 [JP] Japan .................. 1-250476

[51] Int. Cl.⁵ .............. H02K 29/06; H02K 49/02; H02K 17/02
[52] U.S. Cl. .................. 310/166; 310/106; 310/168; 318/138
[58] Field of Search .......... 310/89, 90, 91, 106, 310/114, 126, 132, 166, 168, 170, 185, 199, 254, 264, 269, 49 R; 318/138

[56] References Cited
U.S. PATENT DOCUMENTS

| | | | |
|---|---|---|---|
| 3,679,953 | 7/1972 | Bedford | 318/138 |
| 3,809,990 | 5/1974 | Kuo | 318/696 |
| 3,995,203 | 11/1976 | Török | 318/166 |
| 4,626,719 | 12/1986 | Foster | 310/49 R |
| 4,883,999 | 11/1989 | Hendershot | 310/254 |
| 5,059,884 | 10/1991 | Shah et al. | 318/701 |

FOREIGN PATENT DOCUMENTS
1-185193 7/1989 Japan .

Primary Examiner—Steven L. Stephan
Assistant Examiner—D. R. Haszko
Attorney, Agent, or Firm—Staas & Halsey

[57] ABSTRACT

A reluctance-type motor in which two or more three-phase, half-wave reluctance-type motors are juxtaposed within an outer casing (42), the number of magnetic poles (16a, . . .) and salient poles per motor decreases. Accordingly, a long and narrow motor having a small diameter can be obtained. With a construction in which n number of three-phase, half-wave motors are juxtaposed, the output torque is multiplied by n. Further, by providing a phase difference of 120/n degrees for the output torque of each motor, the torque ripple can be made small and the characteristics at the start-up time become good. By feeding back the magnetic energy in an exciting coil to the D.C. power supply of the applied high voltage, the magnetic energy is extinguished rapidly to prevent a counter-torque from occurring, and a magnetic energy is stored rapidly by the applied high voltage to prevent a reduced torque from occurring. Alternatively, the stored magnetic energy of a de-energized exciting coil is prevented by a diode from flowing back to the D.C. power supply, and the large electro-motive force at that time is utilized to make rapid the storage of the magnetic energy of the exciting coil to be energized next, thereby making the extinguishment and storage of the magnetic energy rapid to prevent a reduced torque and a counter-torque from occurring.

1 Claim, 12 Drawing Sheets

RELUCTANCE-TYPE MOTOR

BACKGROUND OF THE INVENTION

1. Field of the Invention

The present invention is related to a reluctance-type motor which is used as a drive source replacing the conventional D.C. motor and induction motor with an inverter, and particularly can be used when a long and narrow motors, having a small diameter is needed rather than a flat-type one.

2. Description of the Related Art

Since reluctance-type motors have more magnetic poles than D.C. motors, they are difficult to make and have not ever been put to practical use.

Reluctance-type motors are well-known in the art. Reluctance-type motors provide a very low rotational speed and a large output. They have only partly been used for the arm of a robot as a direct drive unit of a load, but are not commercially available.

Reluctance-type motors are somewhat used as a small stepping motors, and wide application therefore has not been developed as yet.

It is difficult to construct a reluctance-type motor having a small diameter and a large output torque since the number of the magnetic poles is large as compared with a D.C. motor.

To explain, by taking a three-phase, full-wave motor of the reluctance type as an example, the number of magnetic poles and salient poles is large, the construction is complicated, and there are six systems of exciting coils. There are at least 12 poles and exciting coils are for a three-phase full-wave energization.

Also, the number of the salient poles of the rotor is at least 14, which is very large. Accordingly, there is a problem that it is difficult to construct a motor having a small diameter.

Further, since the number of times the magnetic energies of the magnetic energies of the magnetic and poles enter and exit during one rotation increases, there is an inconvenience that an increase of the rotational speed is difficult and iron loss increases.

Next, the second problem is that the magnetic energy stored in the exciting coils is remarkably large and a certain time is required for storage. Therefore, the rise of the energization current delayed and a reduced torque occurs.

In addition, some time is required for the magnetic energy to disappear, which causes a counter-torque. The occurrences of the reduced torque and counter-torque increase as the rotational speed rises. Consequently, there is a problem that the efficiency degrades and the rotational speed becomes extremely small. The present invention overcomes the above-mentioned problems.

SUMMARY OF THE INVENTION

It is an object of the present invention to provide a reluctance-type motor which has a small diameter, large output torque, good efficiency and high rotational speed.

The present invention is a reluctance-type motor having a plurality of armatures juxtaposed therein comprising: an outer casing provided with side boards on both sides thereof, bearings provided in the center of the side boards a rotating shaft supported by the bearings for free rotation, a magnetic rotor fixed to the rotating shaft inside the outer casing, four salient poles disposed on the output peripheral surface of the rotor with an equal width and equal spacing angle, n number of stationary armatures (n=2, 3, 4, . . .) juxtaposed within the outer casing with the outer periphery thereof being fixed, six magnetic poles having a width of 120 degrees in electrical angle which are projected from the inner peripheral surface of the stationary armatures and disposed with an equal pitch oppositely to the salient poles through a slight air gap, the magnetic poles existing in axially symmetrical positions being in phase, exciting coils of first, second and third phases mounted on the magnetic poles, a position detecting device including a plurality of position detecting elements which detect the positions of the salient poles to provide one set of position detecting signals of continuous rectangular waves of the first, second and third phases having a width of 120 degrees in electrical angle, and n−1 sets of position detecting signals of the same construction the phases of which are sequentially delayed by 120/n degrees in electrical angle from the one set of position detecting signals, switching elements connected to both ends of the exciting coils, diodes reversely connected to the respective series connecting bodies of the exciting coils corresponding to the switching elements, an energization control circuit for allowing the switching elements at both ends of the exciting coils of the first, second and third phases of each of the n number of stationary armatures to sequentially conduct by the first, second and third position detecting signals included in the n sets of position detecting signals, thereby controlling the energization of the exciting coils, means for adjusting the relative positions of the magnetic poles opposing the salient poles of the rotor so that the driving torques of the rotor by the magnetic poles of the n number of stationary armatures and the salient poles sequentially delayed by 120/n degrees in electrical angle, and for fixing the armatures to the outer casing, means for adjusting the positions of the position detecting elements and fixing them to the stationary armature side so that the output torque due to the energization of the exciting coils of each phase, becomes a maximum value, means for allowing the dischange of the stored magnetic energy of the exciting coils by the reversely connected diodes and the magnetic energy storage to be performed at a high speed, thereby to hold the occurrences of a reduced torque due to the rise portion of the exciting coils in the initial energization stage end of a countertorque due to the extension of the fall portion thereof in the final energization stage minimum values.

Furthermore, the present invention is a three-phase reluctance-type motor comprising: an outer casing provided with side boards on both sides thereof, bearings provided in the center of the side boards, a rotating shaft supported by the bearings for free rotation, a magnetic rotor fixed to the rotating shaft within the outer casing, eight salient poles disposed on the outer periphery of the rotor with an equal width and equal pitch, first and second stationary armatures juxtaposed within said outer casing with the outer periphery thereof being fixed, six first magnetic poles which are projected from the inner peripheral surface of the first stationary armature, opposed to the salient poles through a slight air gap, and excited by three-phase half-wave energization, the magnetic poles existing at axially symmetric positions being in phase, first exciting coils wound around the first magnetic poles, six second magnetic poles which are projected from the innerperipheral surface of the second stationary armature, opposed to the salient poles through a slight air gap, and excited by three-phase half-wave energization, the magnetic poles existing at axially symmetrical positions being in phase, second exciting coils wound around the second magnetic poles, a position detecting device including position detecting elements which detect the positions of the salient poles to provide first position detecting signals of continuous rectangular waves of the first, second and third phases having a width of 120 degrees in electrical angle, and second position detecting signals of continuous rectangular waves of the first, second and third phases having a width of 120 degrees in electrical angle, the second position detecting signals being delayed by 60 degrees in electrical angle from the first position detecting signals, switching elements connected to both ends of the first and second exciting coils, diodes reversely connected to the respective series connecting bodies of the exciting coils corresponding to the switching elements, an energization control circuit for allowing the switching elements connected to the first and second exciting coils to conduct for the widths of the first and second position detecting signals respectively, thereby to energize each exciting coil to generate a three-phase, full-wave output torque, means for adjusting the positions of the position detecting elements and fixing them to the stationary armature side so that the output torque due to the energization of the exciting coils of each phase becomes a maximum value, means for adjusting and fixing the relative positions of the first and second magnetic poles opposed to the salient poles of the rotor so that the phase difference between the output torque through the first magnetic poles and the output torque through the second magnetic poles is 60 degrees in electrical angle, and means for allowing the discharge of the stored magnetic energy of the exciting coils by the reversely connected diodes and the magnetic energy storage to be performed at a high speed, thereby to hold the occurrences of a reduced torque due to the rise portion of the exciting coils in the initial energization stage and of a counter-torque due to the extension of the fall portion thereof in the final energization stage at minimum values.

In accordance with the present invention, a construction is provided in which two or more three-phase, half-wave reluctance-type motors are juxtaposed within an outer casing, the number of magnetic and salient poles per motor decreases.

In the apparatus of the present invention, by setting the magnetic pole width to 120 degrees in electrical angle, the number of magnetic poles is six and are disposed with an equal pitch. There are four salient poles of the rotor.

Accordingly, a long and narrow motor having a small diameter can be obtained.

With a construction in which n number of three-phase, half-wave motors are juxtaposed, the output torque is multiplied by n. Further, by providing a phase difference of 120/n degrees for the output torque of each motor, the torque ripple can be made small and the characteristics at the start-up time become good.

The first problem can be solved by the above action.

By feeding back the magnetic energy stored in an exciting coil to the D.C. power supply of the applied high voltage, the magnetic energy is extinguished rapidly to prevent a counter-torque from occurring, and a magnetic energy is stored rapidly by the applied high voltage to prevent a reduced torque from occurring.

Alternatively, the stored magnetic energy of a de-energized exciting coil is prevented by a diode from flowing back to the D.C. power supply. The large electromotive force at that time is utilized to make rapid the storage of the magnetic energy of the exciting coil to be energized next, thereby making the extinguishment and storage of the magnetic energy rapid to prevent a reduced torque and a counter-torque from occurring.

Accordingly, there is an action for solving the second problem.

For this, the present invention produces the following effects.

First, since the number of salient poles is small, or four, the number of times of entrance and exit of the magnetic energy per rotation is small. Consequently, a motor having a high speed and high efficiency can be attained.

Next, since the number of salient and magnetic poles is small, the diameter can be made small so that a long and narrow motor can be formed.

Moreover, since the construction is such that n number of three-phase, half-wave motors are juxtaposed, the output torque characteristics become good.

In addition, the leakage magnetic flux is less since the magnetic poles of one phase constitute a pair of magnetic poles, N- and S-poles, and thus the output torque increases.

Further, the applied voltage is high, the exciting current is held at a preset value by chopper control, and the large stored energy of the exciting current is rapidly extinguished and stored, so that a high-speed revolution is enabled, and a high efficiency and high output torque are obtained.

Also, if necessary, only by forwardly adding a diode on the power supply side, the same effect is also obtained for a lower power supply voltage.

Furthermore, many of the reluctance-type motors are of the salient pole type, and thus iron loss increases to degrade the efficiency.

The reason for the remarkably large output torque of reluctance-type motors as compared with ordinary motors is that a large magnetic energy is stored in the salient and magnetic poles thereof. Thus, iron increases.

One means to solve this conflict is to decrease the number of salient poles.

With four salient poles (the width is 120 degrees in electrical angle), three-phase half-wave energization is provided as shown. This causes a dead point in the start-up, which makes self-start impossible, and there is a problem that the output torque decreases by about 30% as compared with a motor with eight salient poles and the ripple torque increases.

The present invention solves these problems. The present invention also has a construction in which two reluctance-type motors of three-phase half-wave energization are juxtaposed in an outer casing, and thus the number of magnetic and salient poles per one motor becomes ½, whereby the first problem is solved.

Because of the construction of two motors of three-phase, half-wave energization, there is an action that the same output torque as that of three-phase, full-wave energization is provided.

The magnetic energy stored in an exciting coil is rapidly extinguished by feeding it back to the D.C. power supply of the applied high voltage thereby to prevent the occurrence of a counter-torque. The magnetic energy storage is made rapid by the applied high voltage thereby to prevent the occurrence of a reduced torque.

Alternatively, the stored magnetic energy of a de-energized exciting coil is prevented by a diode from being fed back to the D.C. power supply. The large electromotive force at that time is utilized to make rapid the magnetic energy storage of the exciting coil to be energized next for making the magnetic energy rapidly disappear and be stored. This prevents the occurrence of a reduced torque and counter-torque. Accordingly, the present invention solves the second problem.

Although the construction is that of a three-phase half-wave motor, substantially the same output torque characteristics as a three-phase, full-wave motor is obtained.

DESCRIPTION OF THE PREFERRED EMBODIMENTS

Now, the present invention is described according to the embodiments thereof with reference to the accompanying drawings.

Hereinafter angles are all denoted in electrical angles.

Figure 1:
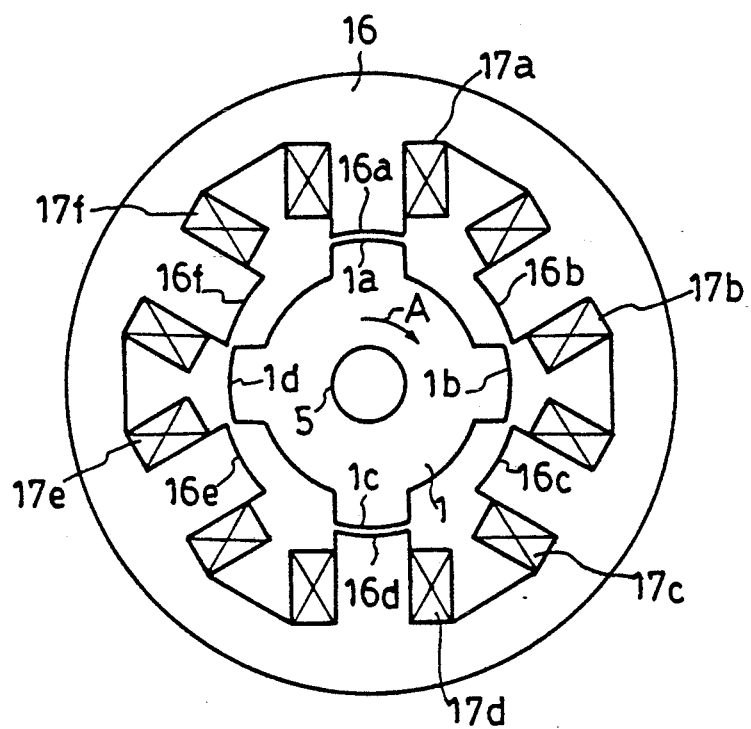
FIGS. 1 (a) and (b) are plan views of a three-phase, half-wave reluctance-type motor according to the present invention.
Figure 1:
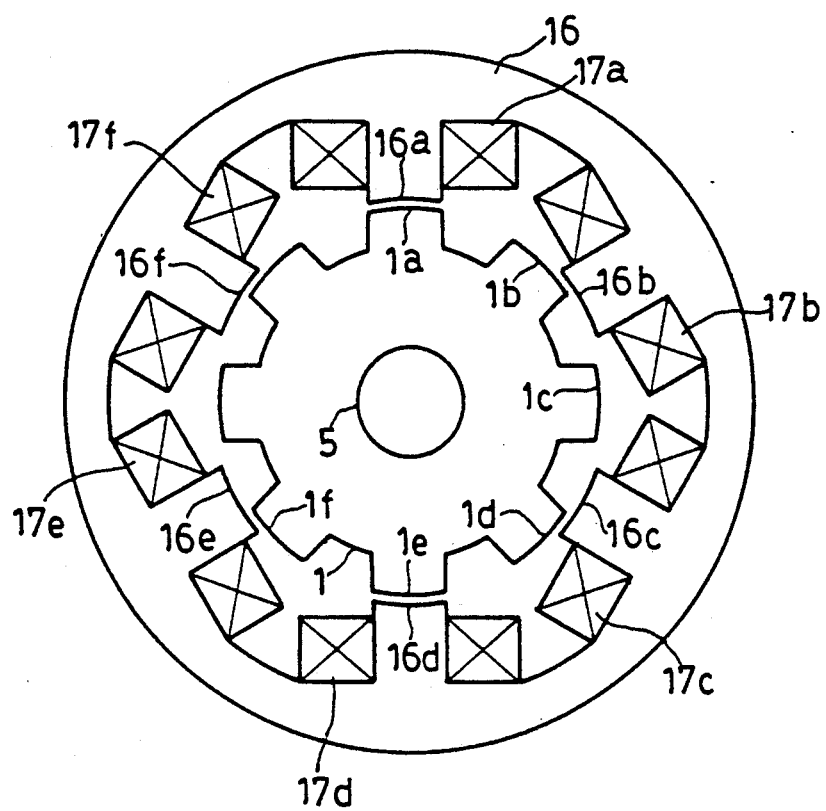

FIG. 1 (a) is a plan view showing the construction of the three-phase, half-wave energization reluctance motor according to a first embodiment of the present invention. FIG. 1 (a) particularly shows salient poles 1a, 1b, ... of rotor 1 thereof, magnetic poles 16a, ... of stationary armature 16 and exciting coils 17a, ...

The width of salient poles 1a, 1b, ... of rotor 1 is 120 degrees. The salient poles 1a, 1b, ... they are disposed with a phase difference of 360 degrees and an equal pitch, respectively.

Rotor 1 is formed by a well-known means for laminating silicon steel plates, and has a rotating shaft 5.

In stationary armature 16, magnetic poles 16a, 16b, 16c, 16d, 16e and 16f are disposed with an equal spacing angle, the width thereof being 120 degrees.

The widths of salient poles 1a, 1b, ... and of magnetic poles 16a, ... are 120 degrees and equal.

The number of the salient poles is four and the number of magnetic poles is six.

Armature 16 is also constructed by the same means as rotor 1.

Figure 2:
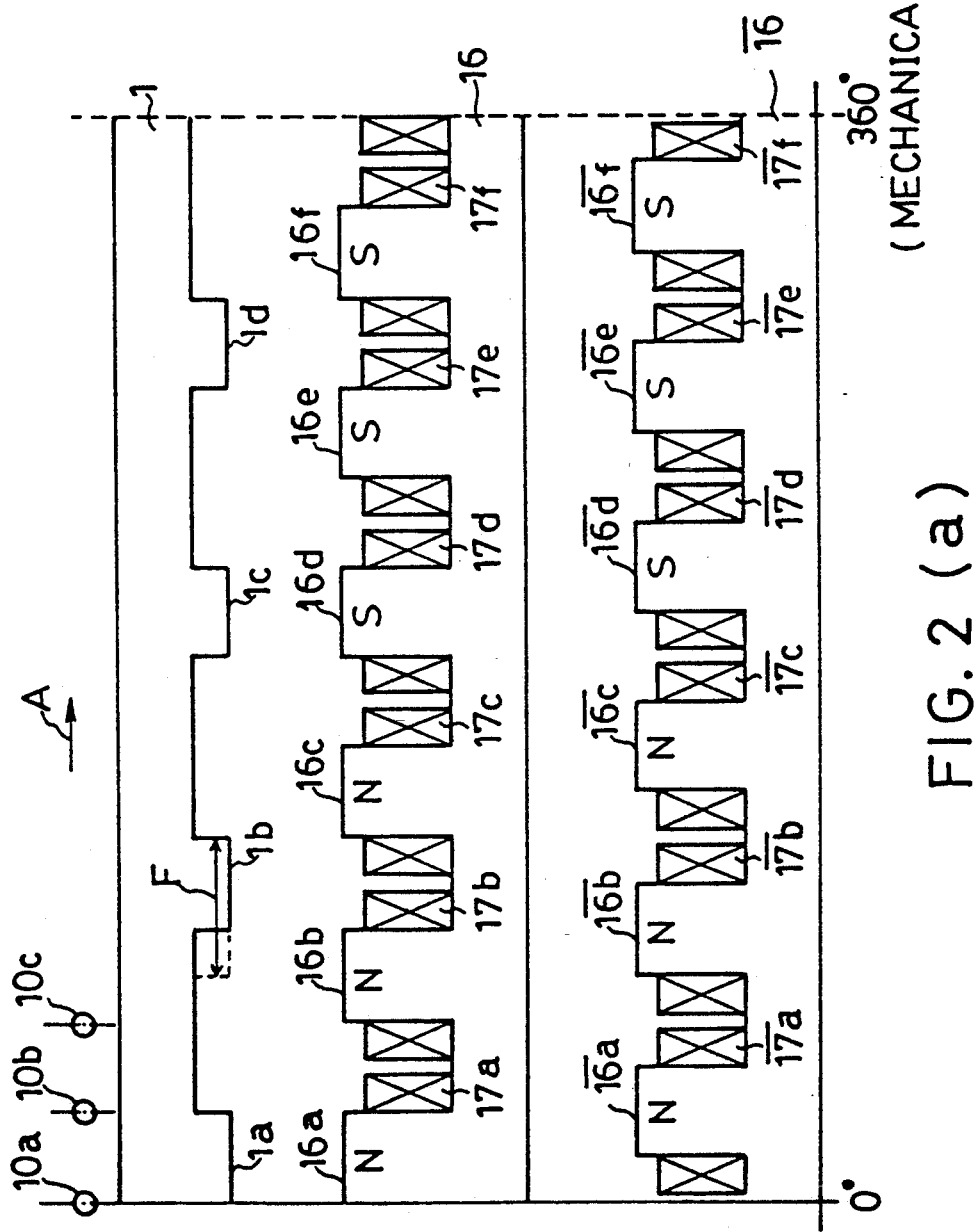
FIGS. 2 (a) and (b) are diagrams of the rotor, magnetic poles and exciting coils of the above-mentioned motor.
Figure 2:
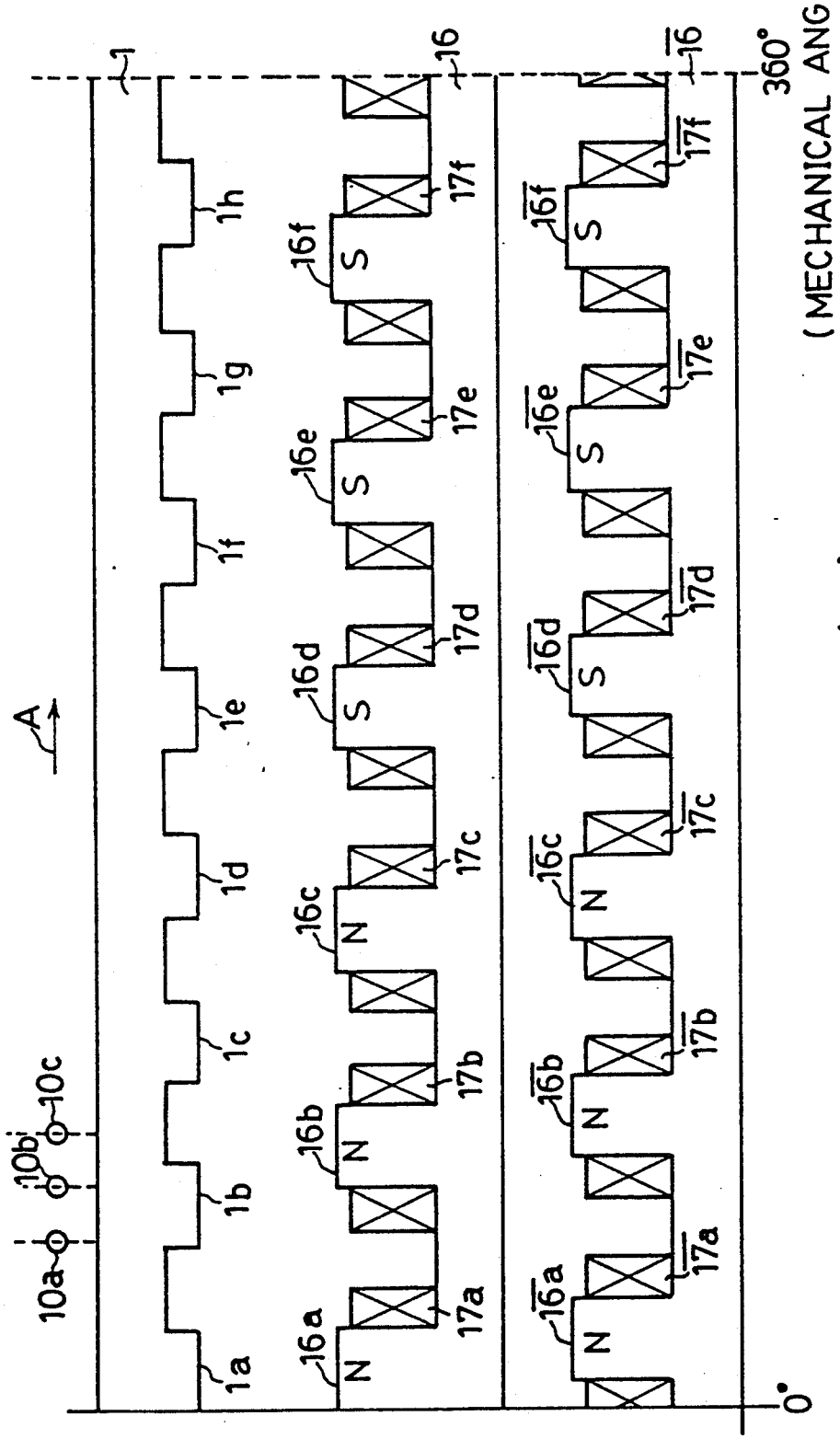

FIG. 2 (a) is a diagram of the three-phase, half-wave reluctance-type motor of FIG. 1 (a). Coils 10a, 10b and 10c are position detecting elements for detecting the positions of salient poles 1a, 1b, ..., and they are fixed to the armature 16 side at the positions as shown and the coil faces are opposed to the sides of salient poles 1a, 1b, ... through an air gap.

A description is now made to the case that the width of salient poles 1a, 1b, ... is 180 degrees and they are spaced by the same angle as described later on.

Coils 10a, 10b and 10c are spaced by 120 degrees.

The coils have a five millimeter diameter and are of the air core type of about 100 turns.

Figure 3:
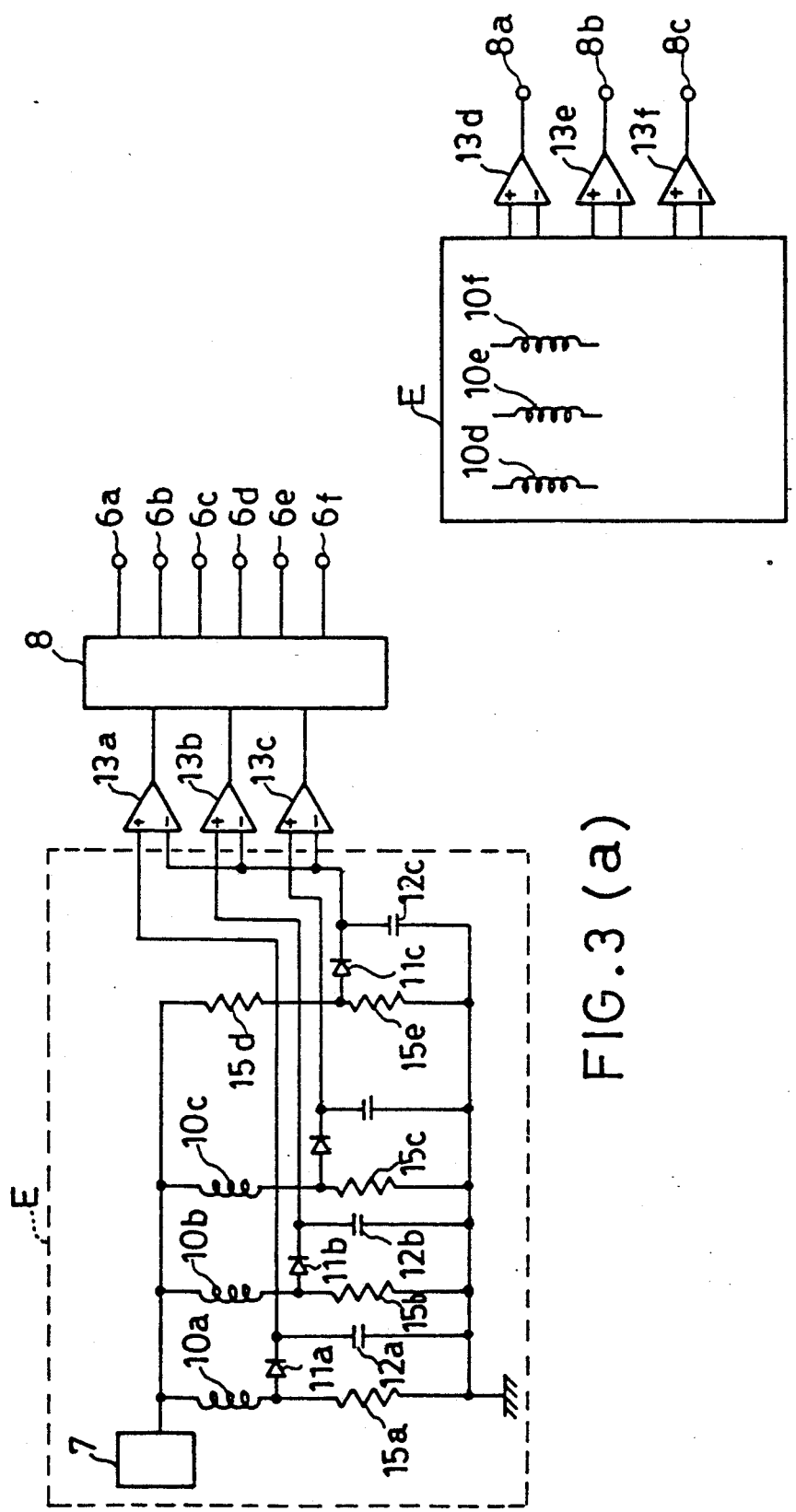
FIGS. 3 (a) and (b) are electric circuit diagrams for obtaining position detecting signals from coils.

In FIG. 3 (a), a device is shown for obtaining position detecting signals from coils 10a, 10b and 10c. Coils 10a, 10b and 10c, and resistors 15a, 15b, 15c ... 15e constitute a bridge circuit. The bridge circuit is adjusted so that it balances when coils 10a, 10b and 10c are not opposed to salient poles 1a, 1b, ...

Accordingly, the output of low-pass filters consisting of diode 11a and capacitor 12a, and of diode 11c and capacitor 12c are equal, and thus the output of operational amplifier 13a becomes a low level.

Oscillator 7 performs an oscillation of the order of megacycles.

Since impedance is decreased by iron loss (eddy-current loss plus hysteresis loss) when coil 10a is opposed to salient poles 1a, 1b, ..., the voltage drop in resistor 15a increases and the output of operational amplifier 13a becomes a high level.

The voltage drops in resistors 15b and 15c also increase when coils 10b and 10c are opposed to the sides of salient poles 1a and 1b, and thus high-level outputs are obtained from the + terminals of operational amplifiers 13a and 13c through low-pass filter 11b, 12b and another low-pass filter, respectively.

Figure 6:
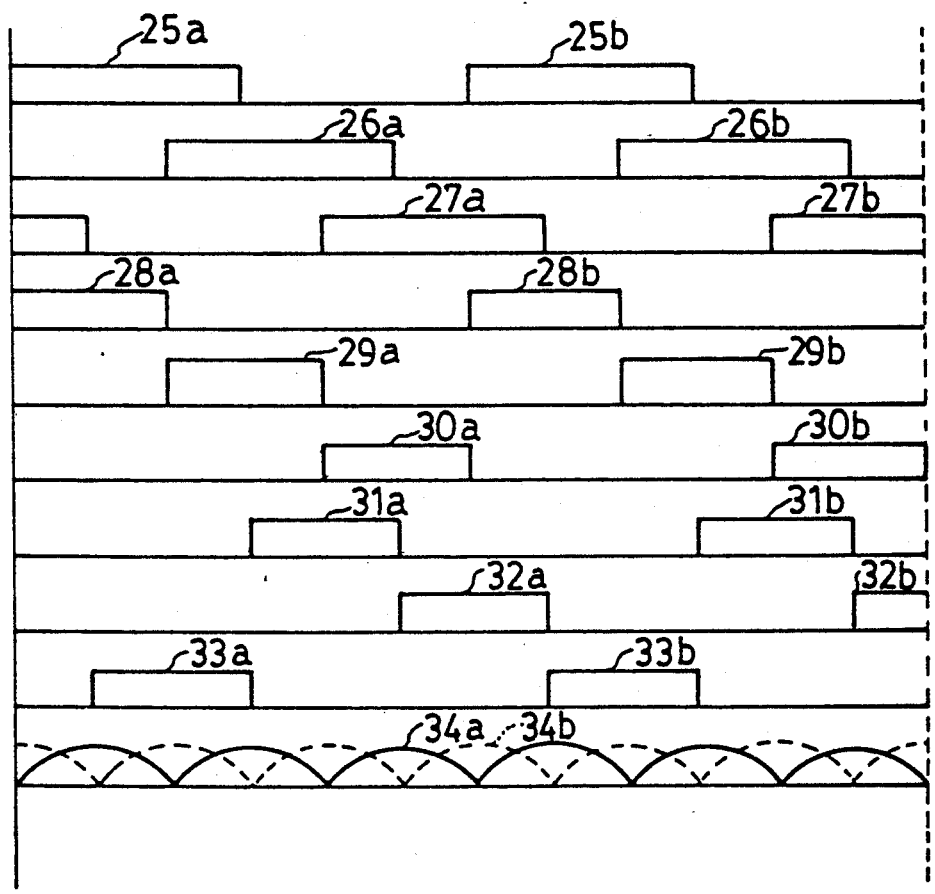
FIG. 6 are time charts of position detecting signals, exciting currents and output torques.

The output signals of operational amplifiers 13a, 13b and 13c are position detecting signals, which are shown in the time chart of FIG. 6 as curves 25a, 25b, ..., curves 26a, 26b, ... and curves 27a, 27b, ...

The above described three sets of position detecting signals are sequentially delayed in phase by about 120 degrees.

Logical circuit 8, which is commonly used for three-phase, Y-type D.C. motors, provides continuous position detecting signals having a width of 120 degrees.

For instance, the electric signals of curves 28a, 28b, ... of FIG. 6 can be obtained by ANDing curves 25a, 25b, ... with the inverted outputs of curves 26a, 26b, ...

The outputs of terminals 6a, 6b, ... 6f of block circuit 8 are shown as curves 28a, 28b, ..., curves 29a, 29b, ..., curves 30a, 30b, ..., curves 31a, 31b, ..., curves 32a, 32b, ... and curves 33a, 33b, ..., respectively.

Curves 28a, 29a and 30a are continuous position detecting signals of the first, second and third phases having a width of 120 degrees.

Curves 31a, 32a and 33a are also continuous position detecting signals of the first, second and third phases having a width of 120 degrees.

Position detecting signals providing the same action and effect are also obtained if an aluminium plate having the same shape as rotor 1 is syncronously rotated instead of rotor 1 to which coils 10a, 10b and 10c are opposed and coils 10a, 10b and 10c are made to oppose to the projecting portions thereof.

Similar position detecting signals can also be obtained by utilizing a magnet rotor synchronously rotating with rotor 1 and utilizing the output change of magnetic resistance elements opposed to the magnetic poles thereof.

The next description is with respect to the means for obtaining position detecting signals from coils 10a, 10b and 10c opposed to salient poles 1a, 1b, ... if the width of salient poles 1a, 1b, ... is 120 degrees and they are spaced by 240 degrees from each other as shown in FIG. 2.

The circuit surrounded by dotted line E in FIG. 3 (a) is shown in FIG. 3 (b) by the same symbol.

Instead of coils 10a, 10b and 10c, coils 10d, 10e and 10f of the same construction are used which are fixed in the same positions as coils 10a, 10b and 10c in FIG. 2 (a), respectively.

Since the outputs of operational amplifiers 13d, 13e and 13f in FIG. 3 (b) are curves 28a, 28b, ..., curves 29a, 29b, ... and curves 30a, 30b, ... in FIG. 6, respectively, the same position detecting signals as the outputs terminals 6a, 6b and 6c in FIG. 3 (a) are obtained.

If three coils of the same construction are fixedly provided oppositely to salient poles 1a, 1b, ... in positions which are delayed in phase by 180 degrees from coils 10d, 10e and 10f, respectively, curves 31a, 31b, .. .. Curves 32a, 32b, ... and curves 33a, 33b, ... in FIG. 6 can be obtained from the three coils using circuitry of the same construction as FIG. 3 (b). Accordingly, they are the same as shown in the outputs of terminals 6d, 6e and 6f in FIG. 3 (a).

Consequently, since position detecting signals of the same nature as FIG. 3 (a) can be obtained, they can be used for the same object.

Although reluctance-type motors have an advantage of very large output torque, they are prevented from being put to practical use because of the following disadvantages.

The first disadvantage is that the exciting coils can not be bidirectionally energized, so that the electric circuit becomes expensive and the number of magnetic and salient poles becomes large, which complicates the construction. Accordingly, it is difficult to make a motor having a small diameter.

In the apparatus of the present invention, by forming a three-phase, half-wave motor, the above stated disadvantage is removed and the inconvenience due to half-wave energization is also removed.

The second disadvantage is that the torque is extremely large in the initial stage in which salient poles start to oppose magnetic poles and it is small in the final stage. Consequently, there is drawback that the composite torque also contains a large ripple torque.

The following means is effective in removing such drawback.

That is, such means the widths of the opposing faces of the salient and magnetic poles in the direction of the rotating shaft different from each other. With such means, the flat portions of the output torque curves are increased by the leakage magnetic flux of the opposing faces as shown by dotted curves 41a, 41b, ... in the time chart of FIG. 5 (a), and thus the ripple component of the composite torque can be decreased by the later described means.

Accordingly, the drawback can be eliminated.

Alternatively, by making the torque curve of one magnetic pole symmetrical by another well-known means, the same object can be achieved by the same means an brushless motors, that is, by performing energization of 120 degrees in width of the central portion.

The third disadvantage is that only a low-speed operation is available. That is, there is a defect that the rotational speed becomes extremely low and the efficiency also degrades if the exciting current is increased to increase the output torque.

Usually, to increase the output torque in reluctance-type motors, it is required to increase the number of magnetic poles 16a, 16b, ... and salient poles 1a, 1b, .. . in FIG. 1 (a) as well as to increase the ampere-turns of the exciting coils, and also to reduce the opposing air gap between the two.

If, at this time, the number of revolutions is held at a required value, the rise slope of the exciting current is made relatively gentle by the magnetic energy stored in magnetic poles 16a, 16b, ... and salient poles 1a, 1b, .. ., and the time required for the discharge current due to the magnetic energy to disappear at the de-energization time is relatively prolonged, resulting in the occurrence of a large counter-torque.

Owing to such circumstances, the peak value of the exciting current becomes small and a counter-torque also occurs, so that the rotational speed becomes low. The efficiency also degrades.

In accordance with the apparatus of the present invention, above described disadvantages are removed as detailed later in connection with the embodiment.

In the plan view of FIG. 1 (a) and the diagram of FIG. 2 (a), circular portion 16 and magnetic poles 16a, 16b, ... are constructed by a well-known means for laminating and solidifying silicon steel plates, and fixed to an outer casing, not shown, to form an armature.

Circular portion 16 is a magnetic core which forms a magnetic path. Circular portion 16 and magnetic poles 16a, 16b, ... are referred to as an armature or a stationary armature. Exciting coils 17a, 17b, ... are mounted on magnetic poles 16a, 16b, ... Exciting coils 17a and 17d are connected is series or in parallel, and such connecting body is referred to as exciting coil K.

Exciting coils 17b and 17e and exciting coils 17c and 17f are similarly connected, and these are referred to as exciting coils L and M, respectively.

When exciting coil M is energized, salient poles 1b and 1d are attracted and rotor 1 rotates in the direction of arrow A.

When rotor 1 rotates 120 degrees, exciting coil M is de-energized and exciting coil L is energized.

When rotor 1 further rotates 120 degrees, exciting coil L is de-energized and exciting coil K is energized.

The energization mode is cyclically changed for each 120 degrees rotation from exciting coil K→exciting coil M→exciting coil L→, and the motor is driven as a three-phase, half-wave motor.

Magnetic poles existing at axially symmetrical positions at this time are magnetized to the N- and S-poles as shown.

Since two magnetic poles to be excited are always heteropolar, the leakage magnetic fluxes passing through the unexcited magnetic poles are in the directions opposite to each other, whereby the occurrence of a counter-torque is prevented.

Means for energizing exciting coils K, M and L is described below.

Figure 4:
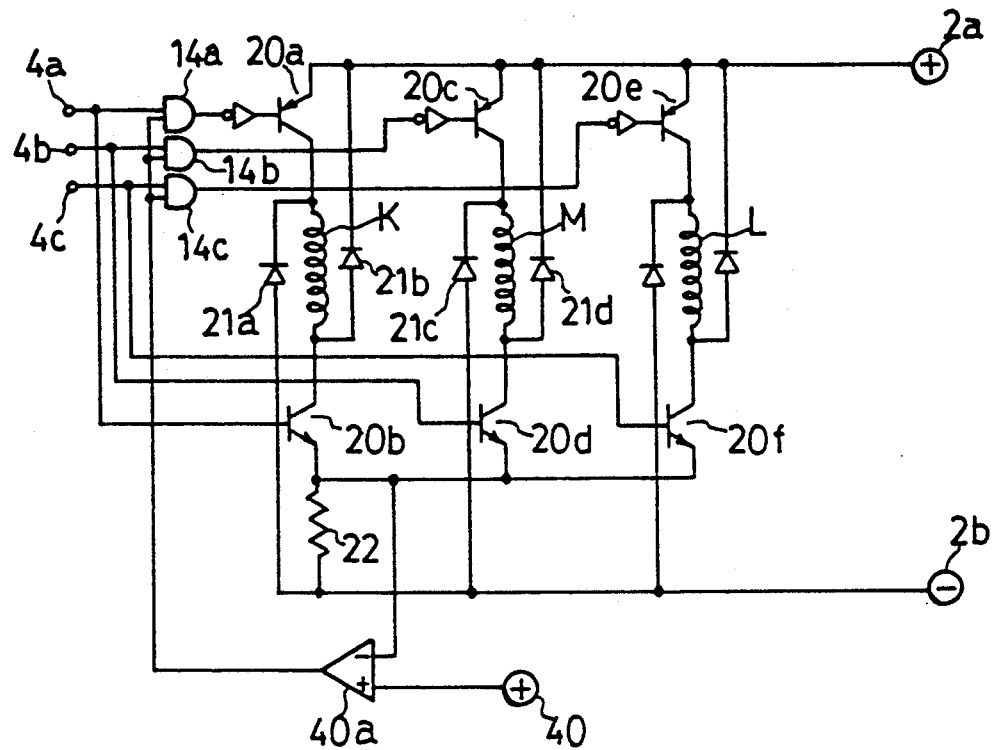
FIGS. 4 (a), (b) and (c) are energization control circuits of the exciting coils.
Figure 4:
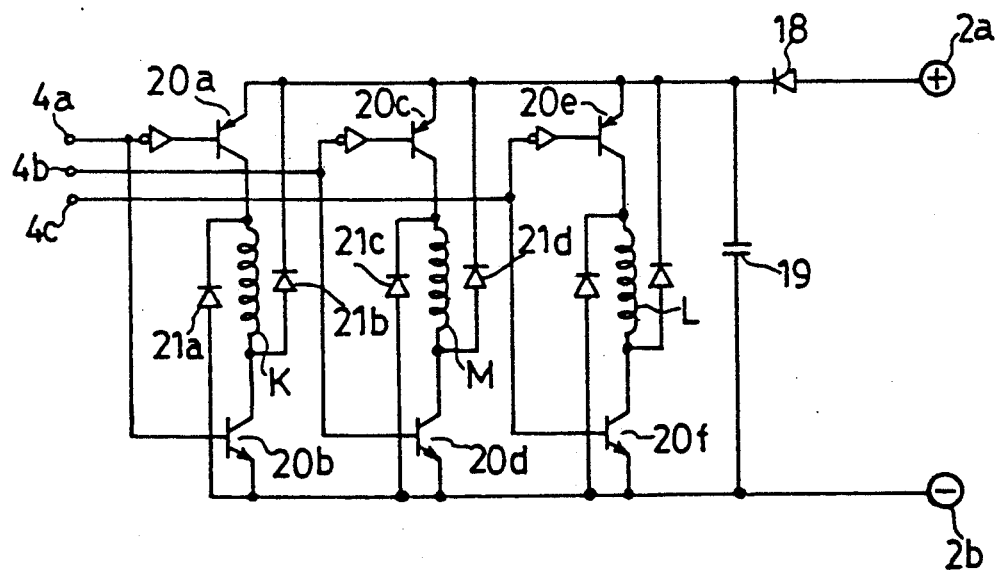
Figure 4:
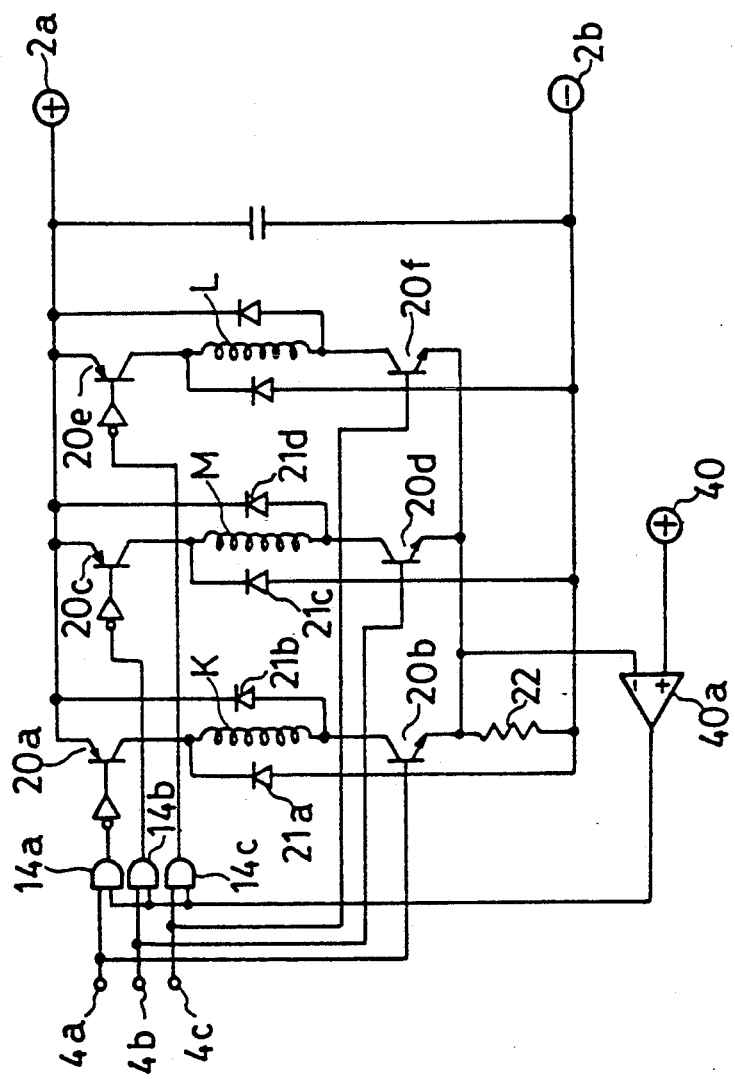

In FIG. 4 (a), transistors 20a and 20b, 20c and 20d, and 20e and 20f, are inserted at both ends of exciting coils K, M and L, respectively.

Transistor 20a, 20b, 20c, ... are switching elements, and any other semiconductor elements having the same effect may be used instead of them.

Power is supplied from positive and negative terminals 2a and 2b of a D.C. power supply.

If a high-level electric signal is inputted from terminal 4a when the lower input of AND circuit 14a is at a high level, transistors 20a and 20b turn on and exciting coil K is energized.

Similarly, if high-level electric signals are inputted from terminals 4b and 4c, transistors 20c and 20d, and 20e and 20f turn on and exciting coils M and L are energized.

Terminal 40 is a reference voltage for specifying the exciting current. The output torque can be altered by changing the voltage of terminal 40.

When the power supply switch (not shown) is turned on, the output of operational amplifier 40a becomes a high level since the input to the −terminal of operational amplifier 40a is lower than that to the +terminal. Thus, transistors 20a, 20b, . . . , 20f conduct and a voltage is applied to the energization control circuit of exciting coils K, M and L.

Resistor 22 is a resistor for detecting the exciting current of each exciting coil K, M, L.

The input signals of terminal 4a are position detecting signals 28a, 28b, . . . of FIG. 6, and the input signals of terminals 4b and 4c are position detecting signals 29a, 29b, . . . and 30a, 30b, . . .

Figure 5:
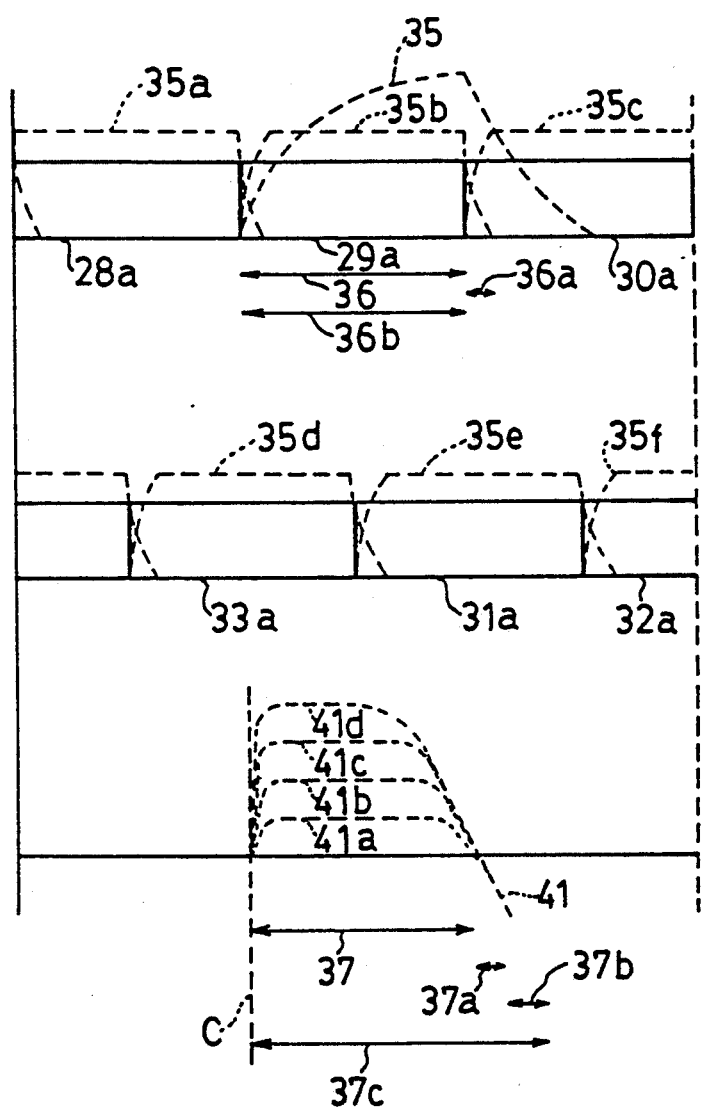
FIGS. 5 (a) and (b)
Figure 5:
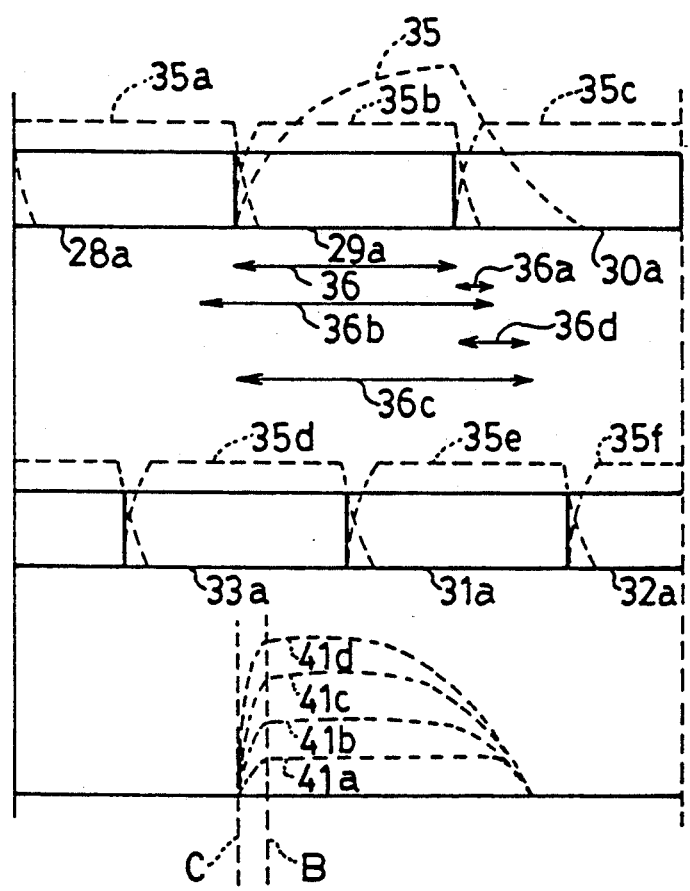

The above-mentioned curves are shown by the same symbols in the first stage of the time chart of FIG. 5 (a).

Curves 28a, 29a and 30a are continuous.

The energization of each exciting coil is described now with reference to the time chart of FIG. 5 (a).

If exciting coil M is energized by typical means for the width of position detecting signal 29a (the width of 120 degrees which is denoted by arrow 36), the rise of the energization current delayed because of the large inductance of exciting coil M as shown by the first half portion of dotted line curve 35. Also, the fall portion is extended by the discharge of a large magnetic energy as shown by the latter half portion of curve 35.

The section of 120 degrees in which a positive torque is generated is shown by arrow 36b.

Accordingly, the torque decreases in the first half portion of curve 35 and a large counter-torque is generated in the latter half portion. Decreasing of a torque is referred to as generation of a reduced torque. Thus, the efficiency degrades and a low-speed rotation is provided.

One characteristic feature of the apparatus of the present invention resides in removing such inconvenience. This is explained below.

If the applied voltage to terminal 2a is made high, the exciting current rapidly rises as shown by dogged line curve 35b and the generation of a reduced torque is suppressed. The stated circumstances are also applied to exciting coil K by position detecting signal curve 28a, and exciting current curve 35a rapidly rises.

Since the widths of curves 28a, 29a and 30a decrease as the speed becomes higher, it is required to use a higher voltage accordingly as the voltage of terminal 2a. If the exciting current exceeds a preset value (specified by the reference voltage of terminal 40 in FIG. 4 (a)), the output of operational amplifier 40a becomes a low level, and thus the output of AND circuit 14a becomes a low level to turn off transistor 20a.

Accordingly, the magnetic energy stored in exciting coil K is discharged through diode 21a, transistor 20b and resistor 22. When the discharge current decreases to a predetermined value, the output returns to a high-level because of the hysteresis characteristics of operational amplifier 40a and transistor 20a conducts again to increase the exciting current.

When the exciting current increases to the preset value restricted by reference voltage 40, the output of operational amplifier 40a becomes a low level and transistor 20a turns off to decrease the exciting current.

This is a chopper circuit repeating such cycle.

At the end of curve 28a, the input to terminal 4a in FIG. 4 (a) disappears.

Consequently, since both transistors 20a and 20b turn off, the magnetic energy stored in exciting coil K is discharged in sequence of diode 21b→power supply terminals 2a and 2b→diode 21a, whereby the energy is fed back to the power supply. Since usually a capacitor having a large capacity for rectification exists in the power supply, the magnetic energy is stored in the capacitor. The width of the fall portion of curve 35a decreases as the power supply voltage increases. If the width of the fall portion is made smaller, a counter-torque occurs less often.

The above described circumstances are completely applied to the other energization curves 35b and 35c, and the action and effect is also the same.

Since the widths of curves 28a, 29a and 30a decrease as the speed becomes higher, it required that widths of the rise and fall portions of curves 35a, 35b and 35c are also made smaller accordingly. That is, it is required to increase the applied D.C. voltage. However, the current value by chopper control, or the output torque is characterized such that it dose not change.

Further, to increase the output torque, it is only necessary to raise the voltage of reference voltage 40 in FIG. 4 (a).

As described above, the apparatus of the present invention is characterized in that the limit of a high-speed rotation and the output are independently controlled by the applied voltage and the reference voltage (the command voltage of the output torque), respectively, and it rotates as a three-phase, half-wave motor.

Control of the control current by the position detecting signal of exciting coil M (the input signal at terminal 4b) is changed by the chopper action of operational amplifier 40a and AND circuit 14b in FIG. 4 (a) and depends on turn-on/off of transistor 20a, as shown by dotted line 35b in FIG. 5, and rapidly falls at the end of curve 29a as shown by a dotted line.

Next, when position detecting signal 30a is inputted to terminal 4c in FIG. 4 (a), the energization of exciting coil L is similarly performed.

As described above, exciting coils K, M and L are sequentially and continuously energized to generate output torques.

Although chopper control by turning-on/off of transistors 20a, 20c and 20e has been described, the object of the present invention is also accomplished by a chopper circuit which uses the outputs of AND circuits 14a, 14b and 14c to perform on/off control of transistors 20a and 20b, transistors 20c and 20d, and transistors 20e and 20f, respectively.

The torque curve of a D.C. motor having a magnet rotor (by N- and S-poles) is symmetrical, but that of a reluctance-type motor is symmetrical. That is, it is remarkably large in the initial stage in which the salient poles enter magnetic poles and it rapidly decreases at the final stage.

There is also a motor by which the output torque curve is made symmetrical. For instance, it is only needed to change the shape of the opposing faces of magnetic and salient poles.

In this case, since arrow 36b (120 degrees) in FIG. 5 (a) is the section in which a positive torque is generated, the torque ripple can be made small by energizing the exciting coil for the width of 120 degrees (arrow 36). However, since a counter-torque is generated in a point in the width of arrow 36a which is the width of the fall portion of exciting current 35b, there is an inconvenience that the torque is reduced. The circumstances are the same for the other exciting current curves 35a and 35c.

In addition, there is an inconvenience that a dead point exists in the boundaries of the position detecting signals and start-up is difficult. The means for removing the latter inconvenience is described later with respect to FIG. 7 (a).

The former inconvenience is described in more detail.

In the torque curves, the flat portions increase as in curves 41d, 41c, ... However, there is an inconvenience that the flat portion of a torque decreases as the exciting current increases, as seen from curves 41a, 41b, ... The ordinate axis represents the exciting current.

Accordingly, the torque ripple increases as the exciting current increases.

As stated above, by changing the shape of the opposing faces of the magnetic and salient poles, the torque ripple can be reduced by even a large output torque.

The apparatus of the present invention has an action and effect that the torque ripple can be removed by the later described means in connection with FIG. 7 (a).

Arrow 37 in FIG. 5 (a) is 120 degrees and it is the section in which a positive torque is generated. The torque curves by magnetic and salient poles for exciting coil M are curves 41a, 41b, ...

The positions of position detecting elements 10a, 10b and 10c are adjusted and fixed so that energization is initiated when salient poles start to enter magnetic poles and de-energization is performed when the two are completely opposed to each other.

After the salient poles completely oppose to the magnetic poles, a counter-torque occurs as shown by curve 41.

The section in which a counter-torque occurs is the section of arrow 37a which has the width of the fall portion of curve 35b. If the width of the fall portion is large, there is a defect that a large counter-torque is generated, whereby the output torque and efficiency are reduced.

The means for removing such defect is described below.

The widths of salient poles 1a, 1b, ... are all made greater than 120 degrees and near 180 degrees. For instance, they are set to 180 degrees.

If salient pole 1b in FIG. 2 (a) is taken as an example, the width thereof is set to the width of arrow F. The widths of the other salient poles are also set to 180 degrees.

In accordance with the above-mentioned means, a positive torque appears in the section of arrow 37a and a small counter-torque occurs in the section of arrow 37b.

Arrow 37c represents a section in which a positive torque is obtained when the widths of both salient and magnetic poles are 180 degrees.

As apparent from the above description, by making the salient pole greater than 120 degrees and near to 180 degrees, the counter-torque due to the fall portion of an exciting can be obviated.

The above described circumstances are completely applied to the embodiment of FIG. 4 (b) which is described later.

The electric circuit of FIG. 4 (b) is now described in detail.

From terminals 4a, 4b and 4c, position detecting signal curves 28a, 29a and 30a in the first stage of FIG. 5 (a) are inputted respectively. Accordingly, exciting coils K, M and L are sequentially energized and rotate as a three-phase, half-wave reluctance-type motor.

The exciting current at this time is as shown by curve 35a in FIG. 5 (a). The height of the central flat portion of curve 35a equals the value which is obtained by dividing the voltage of D.C. power supply terminals 2a, 2b minus the counter-electromotive force (proportional to output curves 41a, 42a, ... ) by the resistance of an exciting coil. Thus, the exciting current becomes flat and rises in the latter half portion.

Since such rise of the current value increases the torque, there is an action that the torque reduction in the latter half portion in torque curves 41a, 41b, ... is prevented.

When energization is stopped at the end of curve 28a, the magnetic energy stored in exciting coil K is prevented by anti-reverse current diode 18 from being fed back to the D.C. power supply side, but it charges capacitor 19 via diodes 21b and 21a to provide a high voltage to the capacitor. Consequently, the magnetic energy rapidly disappears and the current falls as the fall portion of curve 35a.

At this time, transistors 20c and 20d have already been turned on by position detecting signal curve 29a. Thus, the voltage of capacitor 19 is applied to exciting coil M to make the rise of the exciting current rapid and exciting coil M is energized as shown by curve 35a.

The energization after the rise becomes flat completely similarly to the case described as to curve 35a.

The rise and fall portions of exciting current curves 35b and 35c are also made rapid for the same reason when exciting coil M is de-energized and exciting coil L is energized.

Since the widths of the above-mentioned rise and fall portions correspondingly decrease as the capacity of capacitor 19 is reduced, the occurrence of a reduced torque and counter-torque is prevented even for a high speed, providing a characteristic feature of an efficient high-speed rotation.

If there is no time difference in on/off of transistors 20a, 20b, ..., capacitor 19 may be removed.

Also, by increasing the capacity of capacitor 19 in correspondence to the rotational speed, the output torque can be increased and mechanical noises can be reduced.

Since the magnetic energy in an exciting coil is not fed back to the D.C. power supply as in the previous embodiment, the voltage between terminals 2a and 2b can be a low voltage as in typical D.C. motors. Thus, an effective means can be provided which is effective as the drive source of an electric motor car using a battery as its power supply.

In reluctance-type motors, the extinguishment and storage of the large magnetic energy in the exciting coils, which causes a large output torque, leads to reduction of the rotational speed. This is a drawback.

In the embodiment of FIG. 4 (a), however, the rise and fall of the exciting current of each exciting coil are made rapid by a chopper circuit and a high power supply voltage, whereby the drawback is removed.

In the embodiment of FIG. 4 (b), the stored magnetic energy is prevented by diode 18 from being fed back to the power supply, and the electromotive force of the magnetic energy is utilized to store the magnetic energy of the exciting coil to be energized next.

Accordingly, the extinguishment and storage of the magnetic energy becomes rapid thereby to obviate the above drawback, and there is an additional low-voltage power supply.

If an anti-reverse current diode is inserted at the positive voltage terminal 2a in FIG. 4 (a), the current is controlled by a chopper circuit, and the same action and effect as described above is also provided for a low power supply voltage.

As previously described on the time chart of FIG. 5 (a), the same effect is also provided in the circuit of FIG. 4 (b) by performing energization of 120 degrees from point C at which salient poles start to enter magnetic poles (FIG. 5 (a)).

Although anti-reverse current diode 18 in FIG. 4 (b) is provided at the positive electrode 2a side of the power supply, the same effect is also produced if it is provided at the negative electrode 2b side of the power supply.

In this case, diode 18 is forwardly inserted (in the direction in which the exciting current flows) between the lower electrode of capacitor 19 and the negative electrode 2b side of the power supply.

If the capacity of capacitor 19 is 0.1 microfarad or less, the time width required for the magnetic energy of an exciting coil to disappear and to be stored is about 20 microseconds for a motor having an output of 300 watts, providing for a high-speed rotation of 100,000 revolutions per minute.

For the normal rotational speed, it is desirable to increase the capacity of capacitor 19 within a range in which the occurrence of a counter-torque can be prevented.

Eddy-current loss included in iron loss can be reduced by such means, thereby increasing the efficiency.

Since the rise of exciting current delays occurs in this case, it is desirable to adjust the fixing positions of position detecting elements 10a, 10b and 10c so that the point at which energization starts exists at a required position which is more advanced in phase than point C in FIG. 5 (a), or at a required position which is intermediate between point C and point B.

In FIG. 1 (a), magnetic poles in axially symmetrical positions are excited by exciting coils. A construction is provided in which, for example, the forces by which magnetic poles 16a and 16b attract salient poles 1a and 1c in the radial directions cancel each other, and an output torque is obtained by the attraction force in the circumferential direction.

The gist of the technique of the present invention resides in that two or more three-phase, half-wave energization motors of FIG. 1 (a) are used to form a motor of plural-phase energization.

Figure 7:
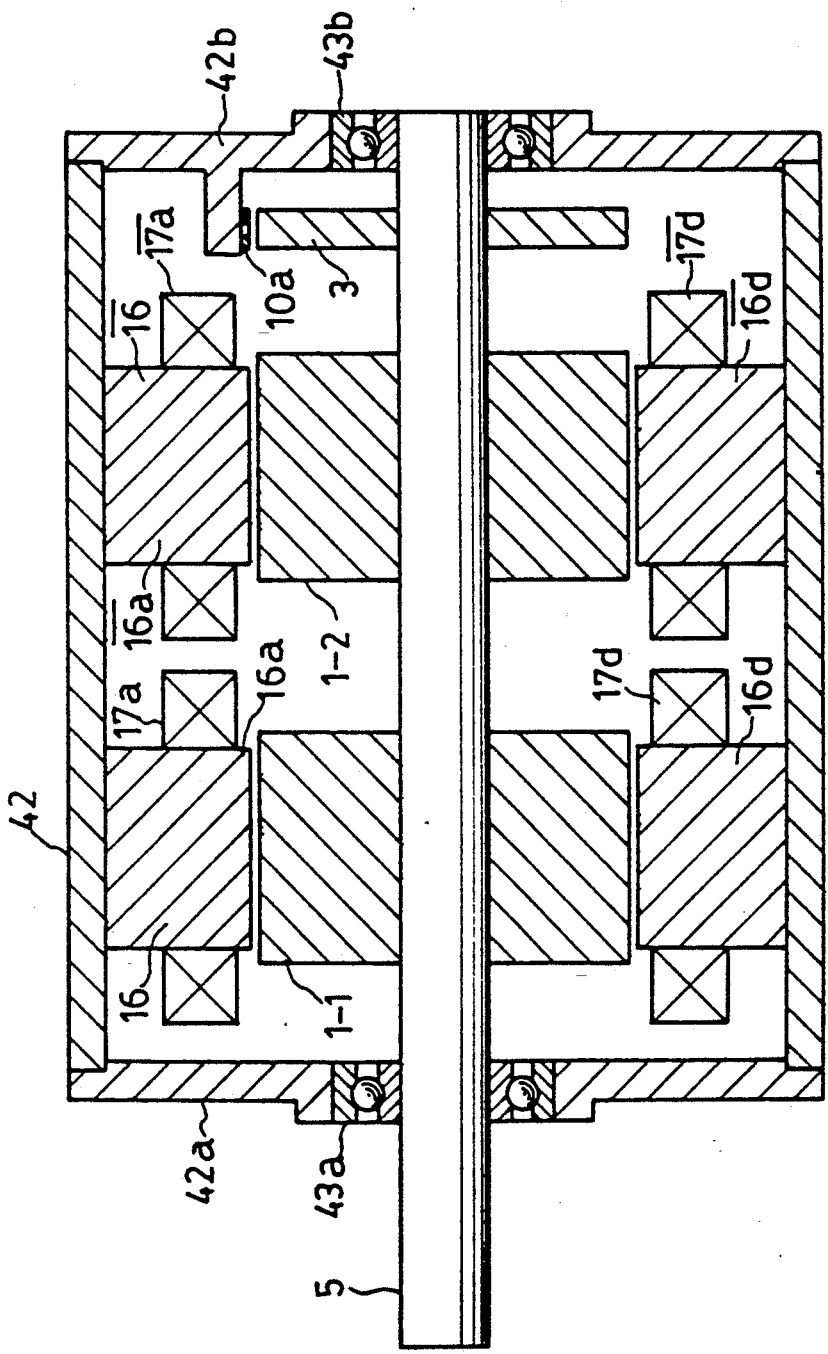
FIGS. 7 (a) and (b) are cross-sectional views of the whole construction of the apparatus of the present invention.
Figure 7:
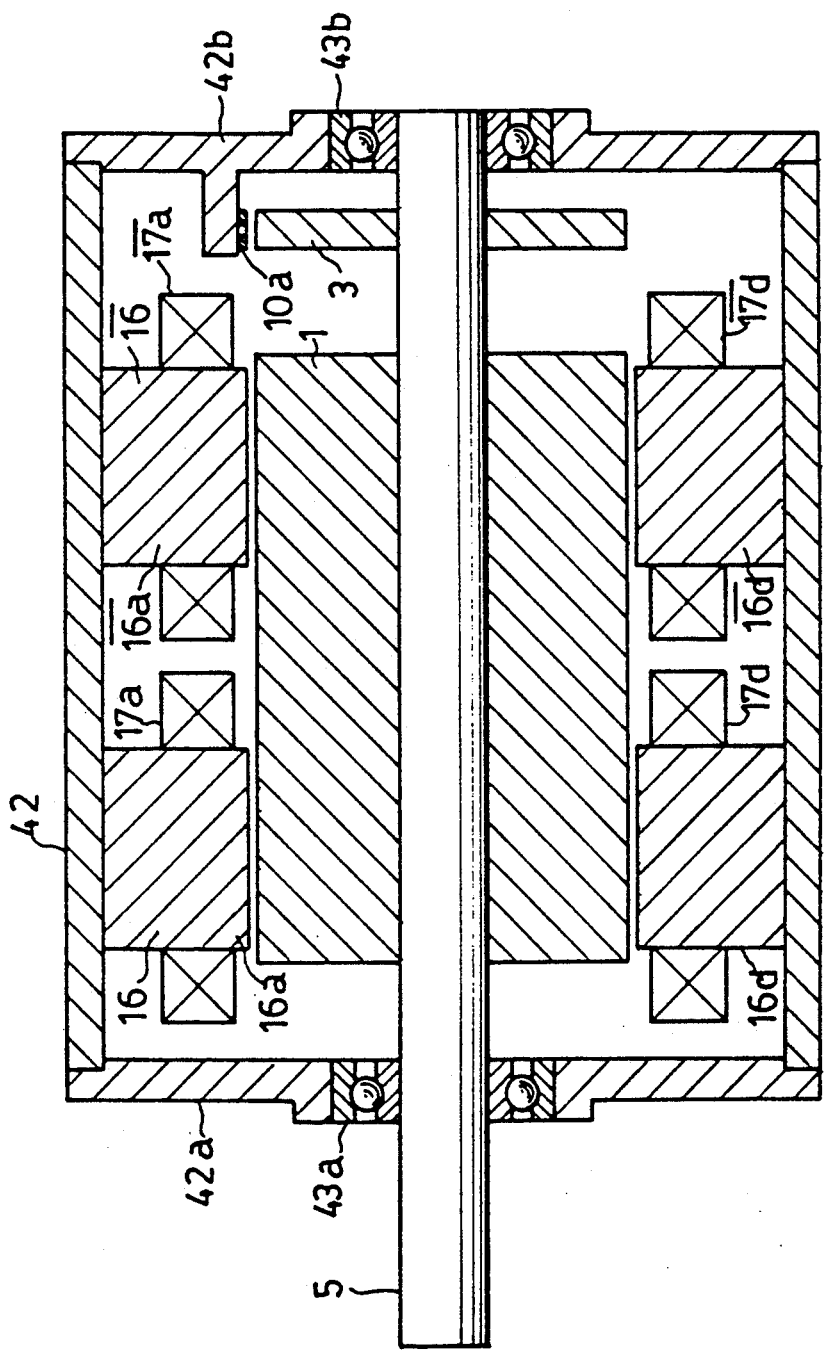

Referring to the sectional view of FIG. 7 (a), the case of two motors is described in detail. In the central portions of side boards 42a and 42b fixed to both sides of cylindrical outer casing 42, ball bearings 43a and 43b are provided, by which rotating shaft 5 is supported.

Rotors 1-1 and 1-2 are fixed to rotating shaft 5, and four salient poles 1a, 1b, . . . are disposed as in rotor 1 as shown in FIG. 2 though they are omitted and not shown.

The outer periphery of stationary armature 16 is fitted in outer casing 42. The magnetic poles are opposed to the salient poles of rotor 1-1 through an air gap. Only magnetic poles 16a and 16d and exciting coils 17a and 17b are shown.

Aluminium disk 3 is fixed to rotating shaft 5, four projecting portions having the same phase and shape as salient poles 1a, 1b, . . . are provided on the outer periphery of disk 3, and to the outer periphery thereof, coils 10a, 10b and 10c fixed to part of side board 42b are opposed which are to become position detecting elements. Only coil 10a, is shown.

The position detecting signals obtained by coils 10a, 10b and 10c are completely the same as the position detecting signals obtained by the means explained in FIG. 3 (a) or FIG. 3 (b).

Accordingly, rotor 1 and stationary armature $\overline{16}$ in can be driven as the three-phase, half-wave energization motor described in FIG. 1 (a) and FIG. 2 (a).

Stationary armature 16 in the outer periphery of which is fixed to outer casing 42 is now described in detail with reference to FIG. 2 (a).

From stationary armature $\overline{16}$, six magnetic poles $\overline{16a}$, $\overline{16b}$, . . . are projecting, around which exciting coils $\overline{17a}$, $\overline{17b}$, . . . are wound. Rotor 1 is common to stationary armature 16a as shown in FIG. 7 (a) or divided into rotors 1-1 and 1-2, as shown and the salient poles are at positions in phase.

Magnetic poles $\overline{16a}$, $\overline{16b}$, . . . are opposed to salient poles 1a, 1b, . . . through a slight air gap. Magnetic poles $\overline{16a}$, $\overline{16b}$, . . . are rightward shifted by 60 degrees with respect to magnetic poles 16a, 16b, . . .

The energization of exciting coils $\overline{17a}$, $\overline{17b}$, . . . is controlled by a circuit of the same construction as the energization control circuits of FIGS. 4 (a) and (b), whereby they are driven as a three-phase, half-wave motor. Exciting coils K, M and L in FIGS. 4 (a) and (b) become exciting coils $\overline{17a}$, $\overline{17d}$ and $\overline{17c}$, $\overline{17f}$ and $\overline{17b}$, $\overline{17e}$, respectively.

The position detecting signals inputted from terminals 4a, 4b and 4c are position detecting signal curves 31a, 32a and 33a in FIG. 6, and become the output signals of terminals 6d, 6e and 6f in FIG. 3 (a).

In FIG. 5 (a), only curves 33a, 31a and 32a are shown, and the exciting currents are shown by dotted lines 35d, 35e and 35f.

The action and effect by energization is similar to that of the three-phase, half-wave energization motor including stationary armature 16.

Torque curve 34a by the magnetic poles of stationary armature 16 and torque curve 34b by the magnetic poles of stationary armature $\overline{16}$ are shown in FIG. 6.

Since the above-mentioned torque curves change depending on the torque curve of one magnetic pole, one example is shown.

Three-phase, half-wave motors of three phases have a dead point at the start-up time, but in accordance with the apparatus of the present invention, the dead point is removed, and there is an effect that the ripple torque of the output torque also becomes small.

As understood from the above description, the motor of FIG. 7 (a) is characterized in that it has the same action and effect as three-phase, full-wave reluctance motors. The number of magnetic and salient poles is equal to that of three-phase, half-wave motors.

Accordingly, there is an effect that the diameter can be made small to obtain a long and narrow motor. There is also an effect that a high-speed rotation is obtained.

In this embodiment, the phases of the salient poles of rotors 1-1 and 1-2 are equal and the phases of the magnetic poles of stationary armatures 16 and $\overline{16}$ are shifted by 60 degrees from each other. Also, it is possible that the rotor is not divided, but used as one common rotor.

The same action and effect is provided if the phase of the magnetic poles of stationary armatures 16 and $\overline{16}$ are made equal, and rotor 1 is divided into two (rotors 1-1, 1-2) and the phases of the respective salient poles are shifted by 60 degrees from each other.

When rotor 1 of FIG. 1 (a) rotates at a high speed greater than 10,000 revolutions per minute, an air vortex is caused by salient poles 1a, 1b, ... and produces a sound like siren.

In order to prevent this, if the grooves between the respective salient poles are filled with a plastic material to remove the irregularities of the rotating circular surface, the above-mentioned siren-like sound disappears.

To prevent the filled plastic material from being peeled off by a centrifugal force, it is preferred to provide recessed grooves in the groove portions between the salient poles and also fill the recessed grooved with a plastic material.

Although the embodiment of FIG. 7 (a) uses two three-phase, half-wave motors, the same object is also attained if two or more motors are juxtaposed.

In the case of a plurality of phases in which n number (n=2, 3, ...) of three-phase, half-wave motors are juxtaposed, if they are called the 1st, 2nd, 3rd, ... motors in the order of juxtaposition, the armature of the 2nd motor is fixed to the outer casing at a position the angular phase of which is delayed by 120/n degrees from the armature of the 1st motor with respect to the rotational direction of the rotor.

Generally speaking, the 1st motor, 2nd motor, 3rd motor, ... are disposed in the outer casing so that they are sequentially delayed by 120/n degrees in angular phase.

To achieve the same object, it is also possible that the armatures of the n number of motors are disposed in phase in a juxtapositional relationship in the outer casing, and the angular phases of the opposing rotors are sequentially shifted by 120/n degrees.

Since the output torque is a sum of output torques the phases of which are sequentially shifted by 120/n degrees, the torque flatness becomes good and the output torque also increases.

Continuous 120-degree wide position detecting signals of the first, second and third phases for controlling the energization of the exciting coils of the 1st, 2nd, ... motors, and n number of energization control circuits by which the energization control is performed are required.

Since the position detecting signals are different though each energization control circuit may be the one having the same construction as described above, the explanation thereof is provided below.

Regarding the position detecting signals of the first motor, from the circuit of FIG. 3 (b), the outputs of terminals 8a, 8b and 8c are used as the position detecting signals of the first, second and third phases.

By a circuit having the same construction as FIG. 3 (b) in which coils 10g, 10h and 10i of the same construction as coils 10d, 10e and 10f are provided at positions which are delayed by 120/n degrees in phase from coils 10d, 10e and 10f, respectively, the position detecting signals of the first, second and third phases of the second motor can be obtained.

By the same means as that described above in which three coils having the same construction as coils 10g, 10h and 10i are provided at positions which are delayed by 120/n degrees from coils 10g, 10h and 10i, respectively, the position detecting signals of the first, second and third signals of the third motor are obtained.

By a similar means, the position detecting signals of the first, second and third phases of each of the fourth, fifth, ... motors can be obtained.

FIG. 1 (b) is a plan view of the construction of the salient poles of the rotor, the magnetic poles of the stationary armature and the exciting coils of the three-phase, half-wave reluctance motor used for the present invention.

The construction of it is mostly common to that of the embodiment of FIG. 1 (a).

The width of salient poles 1a, 1b, ... of rotor 1 is 180 degrees, and they are disposed with a phase difference of 360 degrees and an equal pitch, respectively.

In stationary armature 16, magnetic poles 16a, 16b, 16c, 16d, 16e and 16f each having a width of 180 degrees are disposed at an equal spacing angle.

The widths of salient poles 1a, 1b, ... and magnetic poles 16a, 16b, ... are of an equal value of 180 degrees. The number of the salient poles is eight, and the number of the magnetic poles is six.

FIG. 2 (b) is a diagram of a three-phase reluctance-type motor of FIG. 1 (b) and common to FIG. 2 (a) in the most parts thereof.

When exciting coil L is energized, salient poles 1b and 1f are attracted and rotor 1 rotates in the direction of arrow A. When rotor 1 rotates 90 degrees, exciting coil L is de-energized and exciting coil M is energized.

When rotor 1 further rotates 120 degrees, exciting coil M is de-energized and exciting coil K is energized. The energization mode is cyclically changed for each 120-degree rotation from exciting coil K→exciting coil L→exciting coil M→, and the motor is driven as a three-phase, half-wave motor.

Magnetic poles existing at axially symmetrical positions at this time are magnetized to N- and S-poles as shown.

Since two magnetic poles to be excited are always heteropolar, the leakage magnetic fluxes passing through unexcited magnetic poles are in the directions opposite to each other, and the occurrence of a counter-torque is prevented.

According to a well-known means of providing n number (n=2, 3, ...) of projecting teeth having a width and pitch which are equal to those of magnetic poles 16a, 16b, ..., the output torque is multiplied by n.

Now, the energization means of exciting coils K, L and M are described with reference to FIG. 4 (c) which is substantially common to FIG. 4 (a) in the construction and action, and the time chart is shown in FIG. 5 (b). This time chart is also substantially common to FIG. 5 (a).

When exciting coil L is energized for the width of position detecting signal 29a (shown by arrow 36; 120 degrees) by a typical means, the large inductance of exciting coil L causes the rise of the energization current to be delayed as shown by the first half portion of dotted line curve 35. Also, the fall portion is extended by discharge of the large magnetic energy as in the latter half portion of curve 35. The section of 180 degrees in which a positive torque is generated is denoted by arrow 36b.

Control of the control current by the position detecting signal of exciting coil L (input signal to terminal 4b) changes depending on on/off of transistor 20c by the chopper action of operational amplifier 40a and AND circuit 14b in FIG. 6, as shown by dotted line 35b in FIG. 5 (b), and rapidly falls at the end of curve 29a as shown by the dotted line. Then, when position detecting signal 30a is inputted to terminal 4c in FIG. 6, exciting coil M is similarly energized.

As explained above, exciting coils K, L and M are sequentially and continuously energized to generate an output torque. If the output torque curve is made symmetrical, for instance, it is only needed to change the shape of the opposing faces of the magnetic and salient poles.

Since, in this case, arrow 36b (180 degrees) in FIG. 5 (b) is the section in which a positive torque is generated, by energizing an exciting coil only for the width of 120 degrees (arrow 36) of the central portion of the section, the output torque can be made large and the torque ripple can be made small.

The case of a symmetrical torque curves is described below.

If the magnetic pole widths in the axial direction of the rotating shaft are made different from each other, the flat portions of the torque curves increase as shown by curves 41a, 41b, . . . However, as seen from curves 41a, 41b, . . . , there is an inconvenience that the flat portions of the torques decrease as the exciting currents increase.

Accordingly, if the starting point of energization is made earlier than the energization of 120 degrees in the central portion of the torque curves (the above stated case), the output torques become larger and the flatness of the output torque curves becomes better.

Now, the explanation thereof is provided with reference to the time chart in the third stage of FIG. 5 (b). The torques are flat on the right side of dotted line B, and the widths of the flat portions are narrow as the exciting currents increase. The exciting currents increase in the order of curves 41a, 41b, . . .

To explain exciting coil L by way of example, the fixing positions of coils 10a, 10b and 10c in FIG. 2 (b) are adjusted so that the energization is begun in the vicinity of the beginning of the torque curves in the third stage of the time chart.

The exciting current is as shown by dotted line curve 35b.

Arrow 36 is the width of curve 29a, and arrow 36c is a 180-degrees width in which a positive torque is obtained. If the width of the fall portion of curve 35b is smaller than arrow 36b, no counter-torque occurs. Since this width is two times arrow 36a, a motor of a higher speed can be obtained.

In addition, since the flat portion of the output torque becomes longer, there is a characteristic feature that the output torque ripple becomes smaller.

The exciting currents by the other exciting coils K and M are shown by dotted line curves 35a and 35c, and the actions and effects of them are completely similar.

Since the length of the flat portions of torque curves 41a, 41b, . . . become shorter as the exciting current increases, that is, the curve positions become higher, it is preferred to change the shape of the salient poles opposing the magnetic poles thereby to make the flat portions of the torques as long as possible. This is explained in detail in connection with the sectional view of FIG. 7 (b).

Ball bearings 43a and 43b are provided in the central portions of side boards 42a and 42b fixed to both sides of cylindrical outer casing 42, and rotating shaft 5 is supported by bearings 43a and 43b.

Fixed to rotating shaft 5 is rotor 1, in which eight salient poles 1a, 1b, . . . are disposed as shown in FIG. 2 (b).

The outer periphery of stationary armature 16 is fitted in outer casing 42, and magnetic poles 16a, 16b, . . . are opposed to salient poles 1a, 1b, . . . of rotor 1 through an air gap.

Only magnetic poles 16a and 16d and exciting coils 17a and 17d are shown.

Aluminium disk 3 is fixed to rotating shaft 5. In the outer periphery of disk 3, eight projecting portions which are in phase with and have the same shape as salient poles 1a, 1b, . . . are provided so that they are projecting to the outer peripheral faces of which coils 10a, 10b and 10c fixed to part of side board 42b are opposed. Coils 10a, 10b and 10c act as position detecting elements. Only coil 10a is shown. The position detecting signals obtained from coils 10a, 10b and 10c are completely the same as the position detecting signals obtained by the means described in FIG. 3.

Accordingly, rotor 1 and stationary armature 16 can be driven as the three-phase, half-wave energization motor depicted in FIG. 2 (b).

Stationary armature $\overline{16}$ the outer periphery of which is fixed outer casing 42 is now described in detail with reference to FIG. 2 (b).

In stationary armature $\overline{16}$, six magnetic poles $\overline{16a}$, $\overline{16b}$, . . . are projecting, around which exciting coils $\overline{17a}$, $\overline{17b}$, . . . are wound. Rotor 1 is common to stationary armature 16 as shown in FIG. 7 (b), and magnetic poles $\overline{16a}$, $\overline{16b}$, . . . are opposed to salient poles 1a, 1b, . . . through a slight air gap. Magnetic poles $\overline{16a}$, $\overline{16b}$, . . . are shifted to the right by 60 degrees with respect to magnetic poles 16a, 16b, . . .

By performing the energization control of exciting coils $\overline{17a}$, $\overline{17b}$, . . . by means of a circuit of the same construction as the energy control circuits of FIGS. 4 (b) and (c), driving a three-phase, half-wave motor is enabled.

Exciting coils K, L and M in FIGS. 4 (b) and (c) become exciting coils $\overline{17a}$, $\overline{17d}$, exciting coils $\overline{17b}$, $\overline{17e}$ and exciting coils $\overline{17b}$, $\overline{17e}$ respectively. In this embodiment, rotor 1 is made common, and the phases of the magnetic poles of stationary armatures 16 and $\overline{16}$ are shifted by 60 degrees.

Alternatively, the same action and effect is also provided by putting the magnetic poles of stationary armatures 16 and $\overline{16}$ in phase, and dividing rotor 1 into two and shifting the phases of the respective salient poles by 60 degrees.

The present invention is a reluctance-type motor which is utilized as a drive source replacing a conventional D.C. motor and induction motor with an inverter. Particularly, the present invention, can be used when a long and narrow motor having a small diameter is required rather than a flat-type motor.

I claim:

1. A three-phase reluctance-type motor comprising:
an outer casing provided with side boards on both sides thereof;
bearings provided in the centers of said side boards;
a rotating shaft supported by said bearings for free rotation;

a magnetic rotor fixed to said rotating shaft within said outer casing;

eight salient poles disposed on the outer peripheral surface of said magnetic rotor with an equal width and equal pitch;

first and second stationary armatures juxtaposed within said outer casing with the outer periphery thereof being;

six first magnetic poles projected from the inner peripheral surface of said first stationary armature, opposed to said salient poles through a slight air gap, and excited by three-phase, half-wave energization, said magnetic poles existing at axially symmetrical positons being in phase;

first exciting coils wound around said first magnetic poles;

six second magnetic poles projected from the inner peripheral surface of said second stationary armature, opposed to said salient poles through a slight air gap, and excited by three-phase, half-wave energization, said magnetic poles existing at axially symmetrical positions being in phase;

second exciting coils wound around said second magnetic poles;

a position detecting device including position detecting elements which detect the positions of said salient poles to provide first position detecting signals of continuous rectangular waves of first, second and third phases having a width of 120 degrees in electrical angle, and second position detecting signals of continuous rectangular waves of the first, second and third phases having a width of 120 degrees in electrical angle, said second position detecting signals being delayed by 60 degrees in electrical angle from said first position detecting signals;

switching elements connected to both ends of said first and second exciting coils;

diodes reversely connected to the respective series connecting bodies of said exciting coils corresponding to said switching elements;

an energization control circuit for allowing said switching elements connected to said first and second exciting coils to conduct for the widths of said first and second position detecting signals, respectively, thereby energizing each exciting coil to generate a three-phase, full-wave output torque;

means for adjusting the positions of said position detecting elements and fixing them to the stationary armature side so that the output torque due to the energization of said exciting coils of each phase becomes a maximum value;

means for adjusting and fixing the relative positions of said first and second magnetic poles opposed to said salient poles of said rotor so that the phase difference between the output torque through said first magnetic poles and the output torque through said second magnetic poles is 60 degrees in electrical angle; and means for allowing the discharge of the stored magnetic energy of said exciting coils by said reversely connected diodes and the magnetic energy storage to be performed at a high speed, thereby to hold the occurrences of a reduced torque due to the rise portion of said exciting coils in the initial energization stage and of a counter-torque due to the extension of the fall portion thereof in the final energization stage at minimum values.

* * * * *

UNITED STATES PATENT AND TRADEMARK OFFICE
CERTIFICATE OF CORRECTION

Page 1 of 3

PATENT NO. : 5,168,190

DATED : DECEMBER 1, 1992

INVENTOR(S) : ITSUKI BAHN

It is certified that error appears in the above-indentified patent and that said Letters Patent is hereby corrected as shown below:

Col. 1, line 10, "motors," should be --motor,--;
line 21, "as a small" should be --as small--;
line 32, "are" (second occurrence) should be deleted;
line 46, "current delayed" should be --current is delayed--.

Col. 2, line 43, "dischange" should be --discharge--.

Col. 5, lines 28-29, delete lines in their entirety, and in place thereof insert the following:

--FIGS. 5(a) and (b) and FIG. 6 are time charts of position detecting signals,--;

line 30, "torques;" should be --torques; and--.

Col. 6, line 9, "constitute" should be --form--;
line 59, "to" should be deleted.

UNITED STATES PATENT AND TRADEMARK OFFICE
CERTIFICATE OF CORRECTION

Page 2 of 3

PATENT NO. : 5,168,190
DATED : DECEMBER 1, 1992
INVENTOR(S) : ITSUKI BAHN

It is certified that error appears in the above-indentified patent and that said Letters Patent is hereby corrected as shown below:

Col. 7,  line 18, "Curves" should be --curves--;
line 20, "as FIG. 3(b)." should be --as shown in FIG. 3(b).--;
line 21, "shown in" should be deleted;
line 47, "means the" should be --means makes the--.

Col. 8,  line 58, "20f," should be --20f--.

Col. 9,  line 29, "current delayed" should be --current is delayed--.

Col. 10, line 26, "dose" should be --does--;
line 49, "of" should be deleted.

Col. 14, line 14, "in" should be deleted.

UNITED STATES PATENT AND TRADEMARK OFFICE
CERTIFICATE OF CORRECTION

PATENT NO. : 5,168,190
DATED : DECEMBER 1, 1992
INVENTOR(S) : ITSUKI BAHN

It is certified that error appears in the above-indentified patent and that said Letters Patent is hereby corrected as shown below:

Col. 19, line 8, "being;" should be --being fixed;--.

Signed and Sealed this

Fifth Day of April, 1994

BRUCE LEHMAN

Attest:

Attesting Officer

Commissioner of Patents and Trademarks